(12) United States Patent
Skidmore

(10) Patent No.: US 11,568,579 B2
(45) Date of Patent: Jan. 31, 2023

(54) AUGMENTED REALITY CONTENT GENERATION WITH UPDATE SUSPENSION

(71) Applicant: EDX Technologies, Inc., Austin, TX (US)

(72) Inventor: Roger Ray Skidmore, Austin, TX (US)

(73) Assignee: EDX TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 17/220,906

(22) Filed: Apr. 1, 2021

(65) Prior Publication Data

US 2022/0319058 A1 Oct. 6, 2022

(51) Int. Cl.
*G06T 11/00* (2006.01)
*G06T 7/70* (2017.01)
*A63F 13/26* (2014.01)

(52) U.S. Cl.
CPC .............. *G06T 11/00* (2013.01); *A63F 13/26* (2014.09); *G06T 7/70* (2017.01); *A63F 2300/8082* (2013.01); *G06T 2200/24* (2013.01); *G06T 2207/30244* (2013.01)

(58) Field of Classification Search
CPC ........ G06T 11/00; G06T 7/70; G06T 2200/24
See application file for complete search history.

(56) References Cited

U.S. PATENT DOCUMENTS

| | | | | |
|---|---|---|---|---|
| 10,175,492 | B2* | 1/2019 | Li | G02B 27/0172 |
| 2019/0370544 | A1* | 12/2019 | Wright, Jr. | G02B 27/0101 |
| 2019/0371279 | A1* | 12/2019 | Mak | G09G 5/14 |
| 2021/0089117 | A1* | 3/2021 | Bodolec | G09G 5/14 |

* cited by examiner

*Primary Examiner* — Samantha (Yuehan) Wang
(74) *Attorney, Agent, or Firm* — WCF IP

(57) ABSTRACT

Embodiments involve selective updating and suspension of updates to augmented reality (AR) content.

20 Claims, 4 Drawing Sheets

AUGMENTED REALITY CONTENT GENERATION WITH UPDATE SUSPENSION

FIELD OF THE INVENTION

The invention generally relates to augmented reality (AR) devices and methods of producing augmented reality and, in particular, improvements to user interfaces and usability of augmented reality.

SUMMARY

U.S. Ser. No. 15/436,154 (now issued U.S. Pat. No. 9,836,888) and U.S. Ser. No. 15/796,954 describe processes of producing augmented realities which assist a user such as a telecom company field technician. While a user stands and observes his surroundings with the assistance of a mobile device such as a tablet or smartphone, the device may determine the location and pose to produce a viewing frustum. The viewing frustum permits an understanding of what real world objects and spaces are in the user's field of view. The viewing frustum is applied to a virtual model made to correspond with the real world in which the user is situated, supplemented however with virtual objects which may not be virtual replicas of the real world objects (although such virtual replicas may also populate the virtual model). The virtual objects serve as a pool of candidates for augmentation content that may be supplied to the user. The viewing frustum, as applied to the virtual model, allows selection of only those virtual objects which, if mapped back to the real world, would lie in the user's field of view. These selected virtual objects are then used to produce the virtual content which goes into the augmented-reality output to the user. The virtual additions to the real world content are called augmentations.

A central feature of many exemplary processes described by the '154 and '888 disclosures is syncing the AR output with the user's location and pose. If the location and/or pose changes, the viewing frustum changes, and the AR output changes as necessary to ensure that only virtual objects and augmentations appropriate to the location of the user and the direction the user is looking are displayed. Absent updates in AR output based on changes in location or pose, a risk arises in which augmentations of the AR output may not be in semantic context with the real world surroundings. This defeats a fundamental utility of AR, namely that the combination of the real with the virtual gives more information and more utility than either content type (real or virtual) presented on its own. Worse still, virtual content in an AR output which is not in semantic context with the real world objects and scene that are visible to a user can lead to misinformation and confusion. For instance, if virtual arrows of an AR output displayed over real roadways are intended to help a user navigate a route, but the arrows are not displayed at the correct position with respect to the roadways with which they are intended to correspond, a user may infer a turn or change in route that will lead them down the wrong road, perhaps even into a field or sidewalk.

In short, for certain applications such as industry applications of AR (e.g., a telecom company field technician), the physical relationships (as visually presented in the device output) between real world objects and virtual objects is generally quite significant. This importance contrasts with, for example, certain forms of consumer AR. Pokémon™ GO, for instance, is casually regarded as a form of augmented reality because it combines a real world video feed with a virtual augmentation superimposed on real content, with a dependency on location. At one real world location a Squirtle may appear on a user's tablet or smartphone (the AR device in this example), but at a different location, the Squirtle won't appear. However the precision of the physical arrangement of the virtual objects and real objects matters little. Indeed, pose may be ignored entirely. Whether a Squirtle appears in front of a building or to the side of a building, for example, is of little consequence to this AR consumer game. By contrast, a telecom technician assessing the location of underground wiring or the signal strength within a particular city block necessarily needs to know with precision whether virtual augmentations indicative of these otherwise invisible things are truly accurate and precise representations of the real world objects they are intended to "augment".

Smartphones, tablets, and even wearables (e.g., smartwatches) have become commonplace in the recent years preceding the filing of this disclosure. Among their functions, these devices have proven effective and readily available end user devices for implementing and providing augmented realities. In other words, they generally qualify as "AR devices". In general, such multipurpose end user devices have sensors requisite for determining real world conditions like location and three-dimensional orientation, one or more cameras allowing for a vision-based assessment of physical surroundings, the processing hardware and capabilities (with or without support from remote servers) to manipulate such collected data, and a display component for providing a visual output.

Despite the widespread availability and annually advancing capabilities of end user devices like smartphones and tablets, a fundamental problem exists with respect to their nature of use. The problem is of such significance that it diminishes or even eliminates handheld AR devices' compatibility with some augmented reality (AR) applications. For certain AR applications, a significant utility derives from a close dependency of AR content selection on the location and pose of the device, as discussed above. This maximizes accuracy of semantic context and therefore "realness" of virtual augmentations. The result is a more convincing and persuasive augmentation of the real world. On the other hand, smartphones, tablets, and other multipurpose devices are primarily if not exclusively intended for handheld operation. To a very large extent, user interaction with such handheld devices is most convenient when the display of the device is facing substantially upward and the user is looking substantially downward. Human may of course hold handheld devices out in front of them or even above the head. However, gravity, the position of the sun and artificial lighting, and ergonomic factors ultimately steer users to the same classic position in which the user is looking substantially down. Indeed this natural downward viewing of handheld objects has been the natural posture for studying handheld objects such as books for many centuries. For augmented reality that depends upon viewing surroundings which are not beneath or directly on the ground in front of a user, the tendency of users to look downward when using handheld AR-enabled devices presents a problem.

Similarly, many augmented reality devices, whether handheld, head-mounted, or otherwise available, may be in a state of near-continual motion. This motion may be caused by slight body movements (e.g., holding a device while shifting one's stance), vehicular motion, environmental effects (e.g., wind, water, etc.), or other factors that will tend to introduce varying degrees of motion. This motion can cause frustration for a user who merely wants to interact with AR objects within a certain view.

According to an aspect of some embodiments, a locked view capability is provided for situations such as but not limited to a user wanting to interact with the data "behind" the AR objects, to "drill down". As an example, the device may accept as user input of lock the view, then click on (touch) AR objects selectively to access detailed configuration information, enter edit screens, etc. In most cases, the AR objects themselves may be static (in terms of movement) but any data (e.g., configuration information) that is used to modify the appearance of the AR object (e.g., red=offline; green=online) may be continually changing and used accordingly to drive the AR object display.

DETAILED DESCRIPTION

Figure 1A:
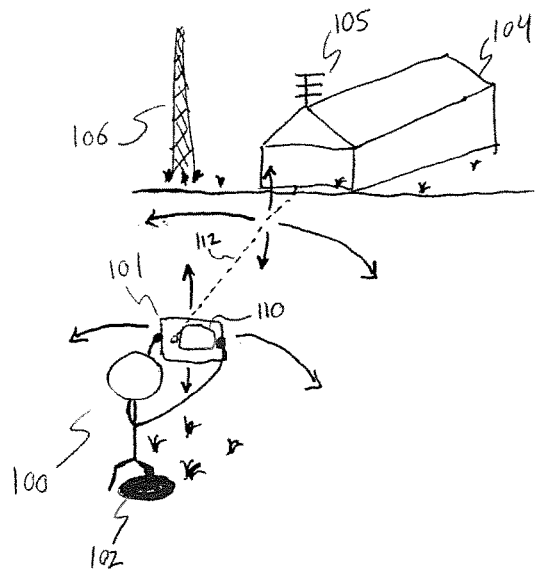
FIG. 1A shows a user standing with a handheld device, the viewing frustum directed toward real world objects which lie before them.

U.S. Ser. No. 15/436,154 (now issued U.S. Pat. No. 9,836,888) and U.S. Ser. No. 15/796,954 are incorporated herein by reference. To any extent the instant disclosure may conflict with the incorporated references, the instant disclosure controls.

AR may comprise active content and/or passive content. Active content may be, for example, a visual output on a display device or an auditory output on a speakerphone device. Passive content may be, for example, visual stimuli from natural surroundings. For instance, on a see-through head mounted display (HMD), the real world is naturally visible to a user through a see-through display surface of the device. Therefore a see-through HMD need only actively display virtual augmentations in order to provide AR content. Real world content is provided but is, in essence, provided passively. Real world content may be provided actively, by for example, capturing real world content with a camera and subsequently displaying the content (e.g., on a screen). The virtual content may be supplied as overlays or otherwise imbedded with the real world video content.

"Virtual reality" replaces the real world with a simulated one. If a system, device, or method results in a user experience that contains only virtual content (i.e., no real content), such result may be called "virtual reality" or "VR".

In general, AR and VR outputs according to exemplary embodiments may take any of a variety of perspectives, including third-person, first-person, top-down, aerial, elevated, others, or some combination of these.

An "augmentation" is a unit of virtual content and may be, for example, a virtual object rendered as a graphic on a display device. An augmentation may be visual (most common), audial, tactile, haptic, thermal, gustatory, smellable, or some combination of these. For example, an augmentation may comprise or consist of sound, video, graphic, and/or haptic feedback. The term "augmentation" is often used in the context of AR but is not incompatible with use in the context of VR. An augmentation may involve one or more (i.e., at least one) sensory modality. Sensory modalities may be visual, audial, tactile or haptic (e.g., vibration), or olfactoral or gustatory, or any combination thereof, e.g., audiovisual. Augmentations may take the form of, for example, 3D representations of real objects (e.g., a detailed 3D representation of a cell tower), or of abstractions of real objects (e.g., a cell tower represented as a simple cylinder with a sphere at the top), or of indicators or cues (e.g., callout boxes). Some information represented in an augmentation may have no corresponding real world shape. For example, a wireless network link between two wireless network antennas has no real world visible representation, so any augmented presentation of that connection is necessarily some kind of abstraction (e.g., a geometric shape). On the other hand some information represented in an augmentation may have at least one straightforward augmentation that is minimally abstract, e.g., a 3D graphic of a building that is positioned, shaped and colored to be very much like a corresponding real building.

"Real content" includes visual content generally determined from light coming from (e.g., reflected from, transmitted by, or emitted from) real world objects. That which human eyes detect in dependence on sunlight (e.g., sunlight reflected off of the human's surroundings) is a non-limiting example of real content. Artificial light may also contribute to producing real content. Cameras which detect sunlight or artificial light from real world objects to produce images of real surroundings may also be said to produce real content. In such circumstances the cameras function analogously to human eyes, and the visual content produced by the human eye or by the camera is real content.

"Virtual content" is visual content which is not determined from light coming from real world objects. Virtual content is often if not always computer generated. Examples will help differentiate virtual content from real content. If a movie film depicts actors in costumes in essentially the same manner as they would appear on a stage in a theater, the movie film is entirely real content. If the movie film contains computer generated imagery (CGI), the CGI content is virtual content and is not real content. The resulting movie may contain a mixture of real content and virtual content. On the other hand, an animated movie film generally contains no real visual content and therefore may be entirely virtual visual content. Of course an animated film may contain recordings of real voice actors, in which case the audio content may be real content. For many examples in this disclosure, references to "content" may be treated as "visual content" unless the context indicates otherwise.

"Quasi-real virtual content" is a specific type of virtual content. The adjective "quasi-real" is used herein to designate virtual content that copies, replicates, or mimics real content. For any quasi-real thing (say, a virtual building, or a virtual street, or a virtual tree), a corresponding real object of similar or identical appearance exists in the real world. A quasi-real virtual thing may have similar, matching, or identical size, shape, color, texture, contours, and/or other visual quality to a corresponding real thing. In addition, in a virtual model (i.e., virtual world) which mimics a real world environment, a quasi-real virtual object also mimics location and arrangement with respect to other objects and surroundings.

"Unreal virtual content" is another type of virtual content. As used herein, the adjectives "quasi-real" and "unreal" are mutually exclusive. Virtual content cannot be both "quasi-real" and "unreal". (Of course virtual content can also never be "real" by definition.) Unreal virtual content does not have any corresponding real object of similar or identical appearance existing in the real world.

An example will help differentiate between "quasi-real" and "unreal". A virtual model of New York City may contain a virtual representation of the real Empire State Building, and the virtual Empire State Building would appear at the same street address or GPS coordinates within the virtual model as the real Empire State Building does in real NYC. In this case the virtual Empire State Building is accurately characterized as a "quasi-real virtual object". If the virtual Empire State Building is visually present in a view, it constitutes "quasi-real virtual content" within the view. By contrast, if a virtual model of London contained a virtual representation of the real Empire State Building, such virtual Empire State Building would be "unreal" (not "quasi-real"). Despite the Empire State Building existing in the real world, it does not really exist in London. Presenting the virtual Empire State Building out of its real world context (London instead of NYC) qualifies it as "unreal". If a view of London included the virtual Empire State Building this would be "unreal virtual content".

"Virtual model" and "virtual world" may be used interchangeably. Since the real world is three-dimensional (3D) to the ordinary perception of humans, a corresponding virtual model may also be characterized as 3D but need not necessarily be so (i.e., a model may be two-dimensional; a model may be four dimensional and include time; a model may be multidimensional with one or more of a plurality of spatial dimensions, a temporal dimension, and other dimensions like color). An exemplary virtual model has virtual locations which are configured to correspond with real world locations. In other words, the virtual model may include a virtual landscape modeled after the real world landscape. Real world geography, locations, landscapes, landmarks, structures, and the like, natural or man-made, may be reproduced within the virtual world in like sizes, proportions, relative positions, and arrangements as in the real world. For example, an exemplary 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location. The virtual model may be renderable in some embodiments. The virtual model may be pre-rendered, depending on the embodiment.

The virtual world containing and storing the virtual objects which are employed for generating AR content may be a 3D virtual representation of the real world which may be stored as data in one or more databases (e.g., a central database or a distributed network). Such databases or networks may store, for example, geometric aspects of the virtual representations and characteristics of the objects which are instantiated within that virtual representation.

A virtual object stored in, with, or with reference to a virtual model may not inherently take a particular state as far as sensory modalities are concerned. For example, a virtual object may not have a particular appearance. Indeed, a virtual object may have no appearance at all, and in essence be "invisible" to an unaided human eye. By contrast, an augmentation is by definition perceptible according to one or more sensory modalities. That is, an augmentation may be seen, heard, touched, smelled, and/or tasted. An augmentation may be regarded as the "face" of a virtual object, in which case data stored in, by, or with the virtual object is used to determine what the augmentation portrays or signifies to a user looking upon that "face".

Virtual objects of a virtual world may be stored and manipulated as data within one or more databases. The virtual objects may have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. If a given virtual object is obscured, then it may not be presented to the user as an augmentation. On the other hand, if the system determines that a given virtual object should be visible to the user given the viewing device's position and orientation in the real world and therefore its position and orientation in the virtual world, an augmentation may be displayed (or otherwise provided).

It should be appreciated that augmentations that are or include auditory and tactile elements still involve virtual objects that need to be identified with accurate spatial relationships with respect to real world objects. For example, a VR device that is an HMD may be used to give a guided tour of a real place like New York City. When a user looks at the Empire State Building with the HMD, the device may announce through a speaker "You are looking at the Empire State Building." This announcement is an auditory augmentation corresponding with a virtual object that has a location in the virtual world which matches the location of the actual Empire State Building in the real world. Without a determination of the field of the view of the VR device (more specifically the FOV of its camera or cameras), the device conceivably could announce to a user that the Empire State Building is visible when in fact it is just outside of the actual field of view.

FIGS. 1A to 1B, and 2A to 2C, provide basic illustration of the underlying problem addressed by exemplary embodiments as well as an exemplary solution. Subsequent figures detail the underlying processes which may be used to achieve this exemplary solution.

In FIG. 1A, a user 100 holding a handheld device 101 stands at a location 102. The location 102, for purposes of visual illustration, is represented as a large point or dot. In front of the user 100 are real world objects 104 and 106. In this example, real object 104 is a barn with an antenna 105, and real object 105 is a wireless tower. The device 101 comprises a camera 108 (labeled in FIGS. 2A to 2C) and a display 110. The user's line of sight and the camera's optical axis are oriented in direction 112 toward the barn object 104. Arrows in FIG. 1A signify that a change in the location or orientation of the device 101 (especially its camera) bring about a corresponding change in the optical axis and thus viewing frustum that extends outward from the device/camera.

Without any augmented reality (AR) output, no wireless network information may be visibly apparent to the user 100 absent the plain appearance of the antenna object 105 and tower object 106—these being real world objects that are visible with the unaided human eye and reproducible with camera 108 and display 110 using real world light which gets reflected off the objects before reaching the camera 108.

Figure 3:
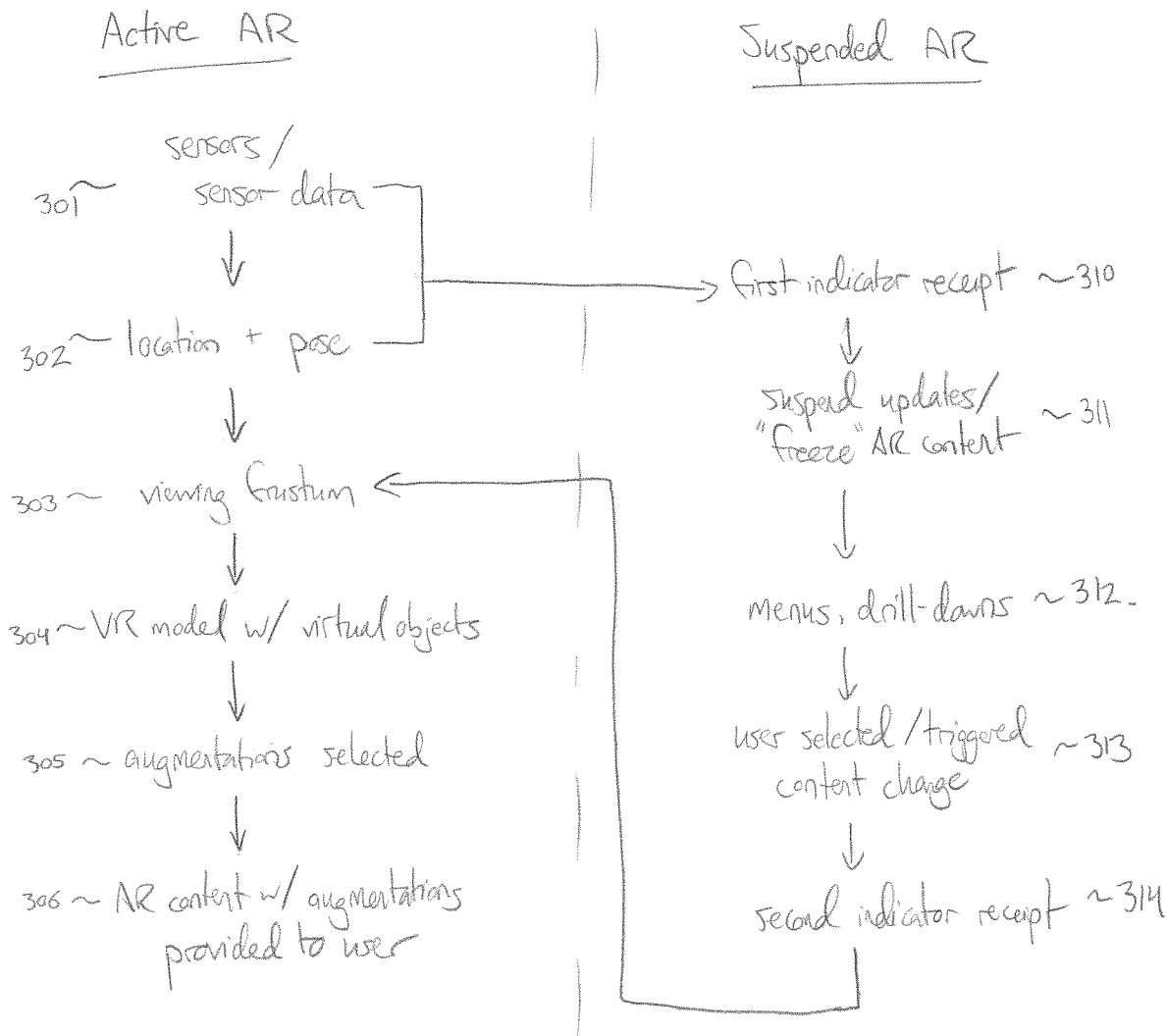
FIG. 3 is a flowchart for an exemplary method.
Figure 4:
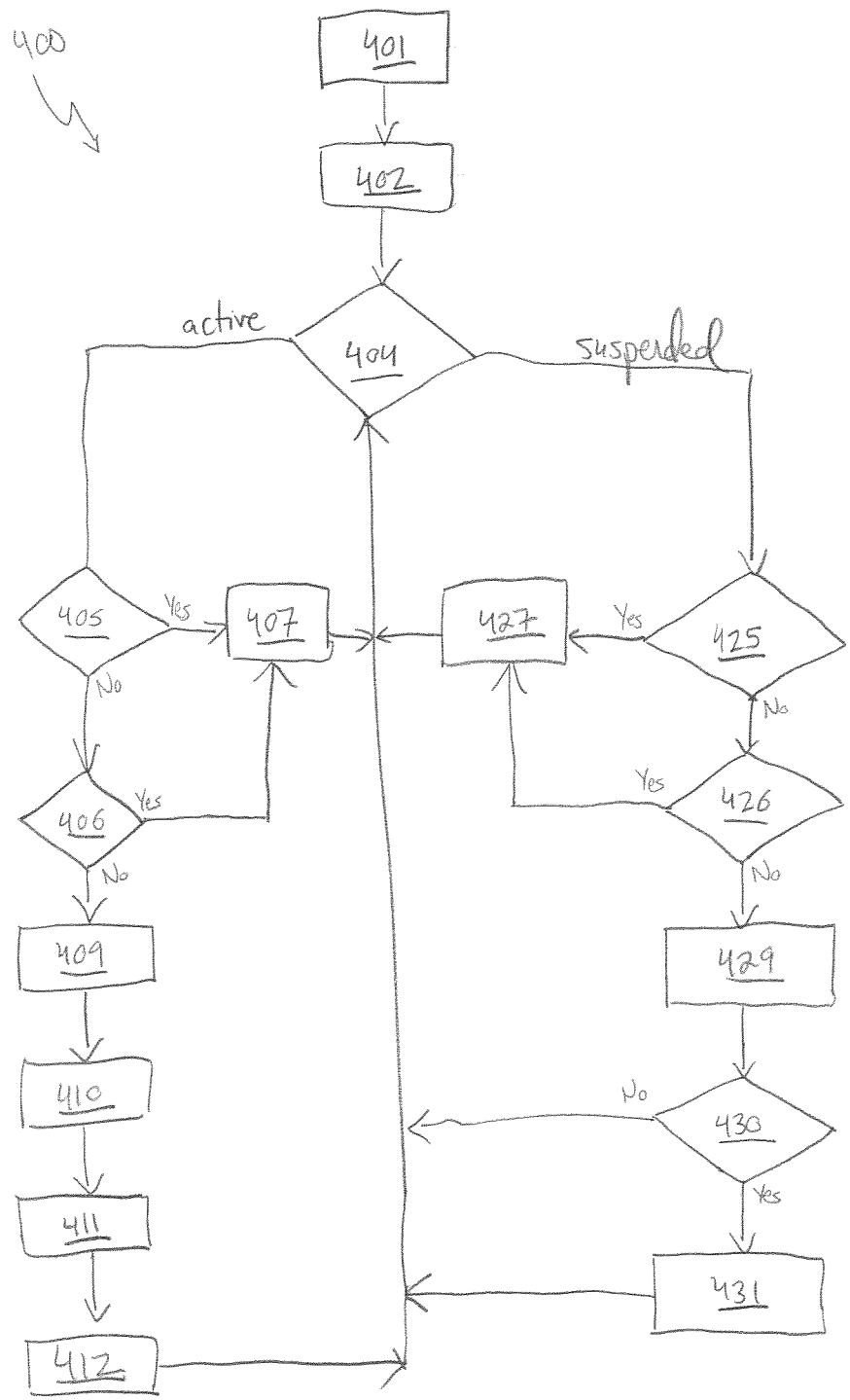
FIG. 4 is another flowchart of an exemplary method.

According to exemplary methods, such as shown in FIGS. 3 and 4 and described below, steps may be performed by or with the device 101 to provide on the display 110 an augmented reality (AR) output to supplement or augment the real world view of real world objects (barn, antenna, and tower in this case).

Figure 2A:
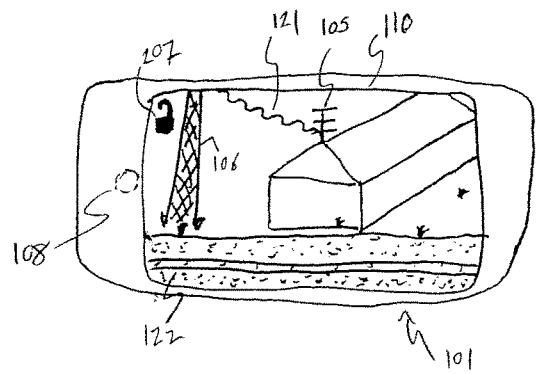
FIG. 2A shows the handheld device as it would appear to the user in FIG. 1A including an AR output to the user which is produced in dependence on the location and pose of the user depicted by FIG. 1A.
Figure 2B:
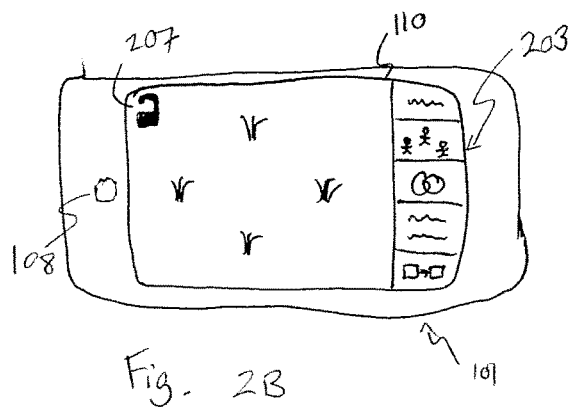
FIG. 2B shows the handheld device as it would appear to the user in FIG. 1B including an AR output to the user which is produced in dependence on the location and pose of the user depicted by FIG. 1B.

FIG. 2A shows example AR content displayed to the user 100 while the user is at location 102 and looking, using device 101, in direction 112. As a matter of terminology, "AR content" may include both "real content" and "virtual content". Specifically, the AR content being displayed with display 110 includes the following real content: barn 104, antenna 105, tower 106, and other surroundings like tufts of grass which are visible in the figures. In FIG. 2A, the AR content being displayed further includes the following virtual content, which are characterized as augmentations: wireless signal connection 121 and underground wire conduit 122 (including a virtual cross-section of the earth in which the conduit 122 is buried). The real content and virtual content are in semantic context with one another. For instance, the position in which the wireless signal connection augmentation 121, which appears as a squiggly line, appears on the screen is such that it terminates at the real tower object 106 and the antenna 105. In this example the wireless signal connection augmentation 121 appears because the tower 106 and antenna 105 are wirelessly connected. If the augmentation 121 were depicted under the barn 104, for example, or off to the right of the antenna 105, for example, the information it is intended to convey (i.e. that a wireless connection exists between the tower and antenna) would fail to be conveyed to the user in an accurate or effective manner. Similarly, the conduit augmentation 122 must necessarily appear in correct relation to the real world antenna object 106 and barn object 104 to accurately represent the whereabouts of a real world conduit which the virtual conduit models but which is not itself visible to the naked eye because it's buried underground.

At points of use, the user 100 desires to interact with the display 110 while it shows the AR content appearing in FIG. 2A. She may, for example, desire to tap the augmentation 121 to open a text bubble that would give the name of the network and other connection characteristics. The user 100 may wish to open a panel of menus to "drill down" into further details relating to the AR content. To begin interacting with the display, e.g., through touch if it's a touch enabled display, or through other means, natural human tendency may encourage the user 100 to switch from the pose depicted in FIG. 1A to the pose depicted in FIG. 1B.

Figure 1B:
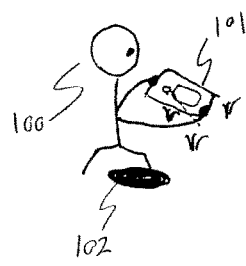
FIG. 1B shows the user standing with the handheld device in a natural, comfortable position in which the viewing frustum is oriented toward the ground.

FIG. 1B shows the user 100 in a new pose which is more natural for viewing tablets, smartphones, and other handheld devices like device 101. In the new position, the user's viewing frustum, and the camera 108's viewing frustum are both oriented downward toward some tufts of grass at the user's feet. In accordance with real time updating of the AR content output by the device 101, the display 110 no longer shows the barn 104, antenna 105, and tower 106. The AR content of the display instead shows merely real world tufts of grass. The user may now be able to comfortably open a panel of menus 203 and drill down in menu options, but the AR content with which the user wished to interact (e.g., the augmentations 121 and 122) are no longer part of the AR content being displayed. In short, the comfortable user interaction pose of FIG. 1B is incompatible with the real time updating of the AR output which depends on real time changes in location and pose.

Figure 2C:
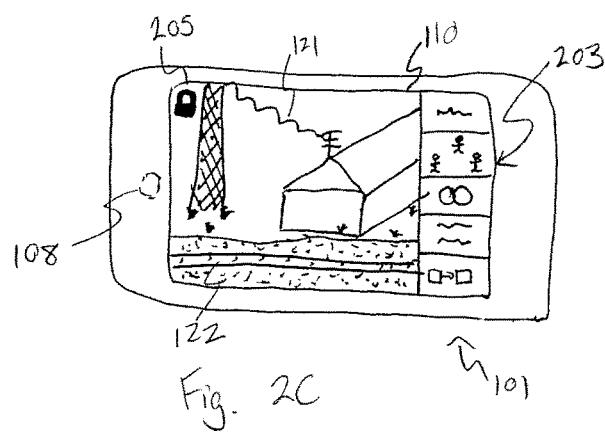
FIG. 2C shows the handheld device according to an exemplary embodiment, in which the AR output corresponds with the position, pose, and viewing frustum of FIG. 1A, despite the real time location and pose of the user at the time of the AR output corresponding with that which is depicted in FIG. 1B.

FIG. 2C shows the result of an exemplary embodiment which provides temporary suspension of AR content updates which are dependent on changes in location and/or pose. In FIG. 2C, the AR content of display 110 corresponds with the location and pose corresponding with FIG. 1A, yet it appears to the user while the user is posed in the relaxed position depicted by FIG. 1B. In this instance, a visual indicator embodied as a lock icon 205 is furthermore provided to convey to a user that location-dependent and/or pose-dependent updates to the AR content of the display have been suspended. The AR content has been "locked" or "frozen" during which time changes in location and/or pose may not necessarily result in any change in the AR content. By contrast, when updating is active, a different icon such as unlocked icon 207 may appear to alert a user that the AR content is being actively updated and therefore is in real time semantic context with the user or the user's device's present location and pose and thus viewing frustum.

Some embodiments are particularly advantageous with respect to their ability to time, react, and adjust AR updates and suspensions according to changing user needs. Exemplary embodiments include intuitive, simple, and convenient means for switching between actively updated AR content and appropriately timed suspensions of active updates for appropriate durations of time, depending on the user's needs and desires. Exemplary embodiments may also advantageously provide specific means of communicating to a user whether the AR device is actively updating AR content or suspending updates.

FIG. 3 presents a basic methodology flow for carrying out some exemplary embodiments of the invention. It may be assumed that for at least some embodiments, sensors are part of or associated with an AR device, whereby the sensor data 301 produced by the sensors are indicative of or usable to determine location and pose 302 of the AR device or the user of the AR device. As exemplary embodiments are especially advantageous for handheld AR devices, and as handheld devices during use are essentially a natural extension of the user (specifically the user's hand), for practical purposes the device's location and sometimes the pose as well may be regarded as the same as the user's location and pose, respectively.

The location and pose information is collected or determined on an ongoing basis, for instance on a substantially continuous basis and/or on a repeating basis. Digital sampling, which may be preferred in some embodiments, inherently involves repeating but not technically a wholly continuous data series. When sampling involves fractions of a second between samples, the sampling may be fairly regarded as substantially continuous despite being technically discretely repetitious. Though FIG. 3 shows sensor data receipt and location and pose determination in the Active AR column, these functions may be performed and in fact are preferably performed in some embodiments on an ongoing basis, irrespective of whether the AR content is actively updated or frozen via an update suspension.

FIG. 3's left hand column shows the progression of steps by which the AR content output by an AR device may be continuously updated to keep the virtual augmentations within the AR content in semantic context with the real world objects within the user and user device's viewing field of view/viewing frustum.

With each instance of refreshed sensor data 301, the latest location and pose information 302 may be used to determine a viewing frustum 303. The viewing frustum 303 is applied to a virtual model 304 (which is mapped to the real world, e.g. with matching locations). Based on virtual objects falling within the frustum in the virtual model, augmentations 305 are selected. AR content 306 with the selected augmentations is then provided to a user.

FIG. 3's right hand column shows an exemplary progression of steps which may occur over the course of an update suspension. At the outset, a suspension of AR updates is prompted by a receipt of a first indicator 310. The first indicator may be, for example, a user input such as a physical button activation, a touch-enabled screen tap or other pattern of contact, a gesture (e.g., the user shaking or twisting the device or moving the device in a unique manner or motion atypical for other uses of the device), a voice command (e.g., "Suspend Updates" or "Freeze Screen"), or some other mode or manner of indicating the user's desire that the content presently on the screen remain despite the possibility of location and/or pose changes succeeding the receipt of the first indicator. In short, the device performing the method of FIG. 3 is configured to detect and interpret a first indicator as indication of imminent or immediate pose change (specifically, change in a vertical component thereof). Further example indicators 310 are explored in greater detail below.

The device reacts to the first indicator by immediately suspending 311 further updates to the AR content based on changes in the location and pose 302. As discussed above, the location and pose 302 may continue to be ascertained on a continuing basis, but the AR content on the screen may not reflect changes which would ordinarily occur in reaction to detected changes in location and pose when updates are active. The suspension serves to "freeze" 311 the AR content appearing on the display at the time of the first indicator's receipt. Some margin of temporal difference may be implied (e.g., within plus or minus a second or some fraction of a second of the receipt of the indicator). A volatile memory buffer may be used to store the AR content produced and displayed over the last 1, 2, or 3 seconds, for example, and the "frozen" AR content made to correspond with what is in the memory buffer. This would avoid the possibility of freezing content which may be blurred, e.g., as a result of a first indicator 310 that involves sudden movement of the device.

With the AR content substantially frozen on the display of the device, the user is permitted to freely change pose and/or location without risking losing access on the display to the AR content leading up to receipt of the first indicator 310. The user may advantageously assume a more natural position or pose for tablet or smartphone use such as is depicted in FIG. 1B (and in contrast to what is depicted in FIG. 1A). The user can furthermore comfortably open menus and make drill down selections 312. A panel of menus 203 is shown in FIG. 2C for illustrative purposes.

Suspension has the effect of causing at least some content of the AR content being output at the time of receipt of the first indicator to be continuously provided irrespective of the pose change. This does not mean, however, that the AR content is completely immutable until the suspension is terminated and the updates resumed. Different changes to AR content may or may not be permitted depending on the use case of a specific embodiment, user, and/or application.

During a suspension, some AR content which is real content may be displayed irrespective of changes to the display device (or user's) location or pose changes. Meanwhile some AR content which is virtual content may be updated based on one or more real world events, e.g., real world changes based on location and pose.

According to one implementation, suspension comprises holding the viewing device location, orientation, and real world view static as well as the virtual content static—meaning that the current state of the AR content within the current view would be also locked. This approach holds the time aspect of the AR content static and unchanging from the point in time of the "lock."

According to another implementation, suspension comprises holding the viewing device location, orientation, and real world view static, but the virtual content may still be dynamic. The virtual content may still reflect some type of change on the display, e.g., moving due to being tagged to a moving object, changes from green to red based on some other events, disappears because the triggering event expired, new AR content appears, etc. Essentially, the AR content may be dynamically changing over time. This approach leaves the AR content free to change over time due to other ongoing events.

As a concrete example, a method may comprise tracking specific (real world) cars. According to one implementation, while the screen is locked the viewer won't see any AR objects (augmentations) highlighting any relevant cars that traverse the real-world view while looking at the (previously) locked device view. In contrast, according to a second implementation, the device will display to the user AR objects (augmentations) representing relevant cars moving across the locked device view, but the viewer won't see their real-world counterparts on the device view. Depending on the use case, either, neither, or both approaches may be employed.

User selected or user triggered input 313 may bring about changes to the AR content. The manners in which a user may change the AR content are virtually infinite, but a few examples may include removing from view a particular augmentation, changing the visual appearance of an augmentation, and adding to the view additional augmentation(s). What makes changes 313 different from the changes to AR content which occur during active updating at 306 is that changes 313 are based on user selections or triggers which may be entirely independent of any considerations of pose and/or location 302.

When it's said that at least some AR content is continuously provided irrespective of the pose change, it should be appreciated that the provided AR content does not necessarily need to be displayed for the whole duration of the suspension. It may mean that the "frozen" content is available for viewing, but not that the "frozen" content is necessarily on display at any given moment of the suspension. According to one exemplary characterization, the receipt of a first indicator 310 may be regarded as taking a "snapshot" of the AR content, and such snapshot is stored in a volatile or non-volatile memory for a duration of time which is preferably at least as long as the duration of the suspension. Some snapshots may be stored even longer. In this way a user may save a variety of snapshots of frozen AR content and then go through them or switch between them at some later time. This would allow for convenient and useful comparisons. In addition, during a suspension, a user may be permitted to pan (e.g., left, right, up, down) or zoom (in or out) within "frozen" view. To allow this functionality, the device may store "frozen" content relating to the real world and the virtual model which are outside the viewing frustum at the time of the freeze/suspension.

As implied by the word choice "suspension," the duration thereof is ordinarily of a finite length, and it is generally the case that active updating of AR content, meaning live AR content in dependence on the AR device's (or its user's) live location and pose 302, will eventually be resumed. To terminate a suspension and resume updating, a second indicator 314 may be input by the user and received by the device. The second indicator, like the first indicator, may be any one or more of a variety of different user inputs. The second indicator may be, for example, a user input such as a physical button activation, a touch-enabled screen tap or other pattern of contact, a gesture (e.g., the user shaking or twisting the device or moving the device in a unique manner or motion atypical for any other uses of the device), a voice command (e.g., "Resume Updates" or "Unfreeze Screen"), or some other mode or manner of indicating the user's desire that the content on the screen be made to update in connection with the present location and/or pose changes 302. Further example indicators 314 are explored in greater detail below.

After a suspension is terminated with an indicator 314, the active AR updating using real time location and pose 302 to determine present AR content is resumed.

FIG. 4 is a flowchart showing an exemplary logic tree for a computer-implemented method 400 of augmented reality with convenient pausing and resuming of active updating based on location and pose. Method 400 presents logic decisions which may be used by an exemplary AR device, the processor of which may be executing a set of stored instructions which trace the logic of FIG. 4. Data indicative of or usable to determine location and pose of a user or user device is collected at block 401. The data may be, for example, from a GPS module, gyroscope, magnetometer, digital compass, accelerometer, or one or more of these. Location and pose are determined at block 402. It should be generally understood that blocks 401 and 402 may generally be performed continuously or repetitively for the full duration of use of the AR device. Block 404 queries whether an operating status is set to active or suspended. The status may be a stored value which tracks whether, at any given time, the method 400 is conforming to active AR updates (e.g., left hand column of FIG. 3) or a suspension of active updates (e.g., right hand column of FIG. 3).

If the result of the query at block 404 is "active," the method proceeds to block 405 with a query of whether the most recently surveyed pose from block 402 qualifies as a pause indicator (i.e., indicator 310 in FIG. 3). In exemplary method 400, the executing device is configured to use pose itself as an automatic trigger for switching between active updates and suspended updates. Changes in a vertical component of pose from block 402 are compared to a threshold to detect substantial changes associated when a device switches from being held substantially in front of a user (e.g., with camera axis between 60 and 120 degrees from vertical) to being held in a relaxed position (e.g., with camera axis between 0 and 60 degrees from vertical), or vice versa. In other words, a vertical component of pose is monitored to detect a change in device use from FIG. 1A to FIG. 1B, or FIG. 1B to FIG. 1A, for example. If at block 405 the change in (a vertical component of) pose exceeds a predetermined threshold, the status is changed to "suspended" at block 407. The method then returns to block 404.

If pose does not qualify as a pause indicator at block 405, a further inquiry block 406 may check for any other pause indicator (e.g., a gesture, a voice command, a screen button tap, etc. as discussed above). If a pause indicator is received, the status is changed to "suspended" at block 407 and the method returns to block 404. If no pause indicator is received, the method proceeds to block 409. At block 409, the latest location and pose data of block 402 is used to determine a viewing frustum. The viewing frustum is applied to the virtual model (which is mapped to the real world with matching locations) at block 410. Based on virtual objects falling within the frustum in the virtual model, augmentations are selected at block 411. AR content with the selected augmentations is provided in block 412. During an uninterrupted session of active updating, the logic will continue from block 401 to block 412 on an ongoing or repeating basis, providing the user an AR experience which maintains semantic context with the real world and taking into account any changes in the user or user's device's location and/or pose.

If at block 404 the status is "suspended," the method 400 proceeds to block 425. Complementary to block 405 of the "active" logic pathway, block 425 of the "suspended" logic pathway queries whether the most recent pose change passes its predetermined threshold. If so, it qualifies as a resume indicator (i.e. second indicator 314 in FIG. 3), the status is switched to "active" at block 427, and the method returns to block 404.

If a recent pose change does not qualify as a resume indicator (e.g., a change in a vertical component of pose does not indicate a change of the device orientation of FIG. 1B switching to the device orientation of FIG. 1A), a further inquiry may be made of whether any other resume indicator is received at block 426. If a resume indicator is received, the status is changed to "active" at block 427, and the method returns to block 404.

If on the other hand no resume indicators are detected or received at blocks 425 and 426, the last update to AR content is maintained at block 429. This AR content may be, for example, the AR content which was displayed at the last instance of the last active session (i.e., the latest AR content from block 412 as of the status change to suspended at block 407). As discussed above, maintaining AR content during a suspension of AR updates does not necessarily mean the AR content on the screen is immutable. At block 430, the method 400 monitors for any user inputs, selection, or request which may then result in changing the AR content at block 431 to satisfy the user input, selection, or request. Blocks 430 and 431 then both have returns to block 404.

The text which may be inserted into the respective blocks of FIG. 4 are as follows:

401—collect/receive sensor data
402—determine location/pose
404—check status: active or suspended?
405—pose satisfy pause indicator?
406—other pause indicator received?
407—change status to "suspended"
409—determine viewing frustum
410—apply frustum to virtual model
411—selection augmentations
412—update AR content
425—pose satisfy resume indicator?
426—other resume indicator received?
427—change status to "active"
429—maintain last generated AR content
430—user menu selection or drilldown?
431—change AR content to satisfy user input The preceding descriptions have for convenience and conciseness of illustration identified handheld mobile devices as a particular area of utility for embodiments of the invention. However, advantages extend far beyond handheld devices. For example, head mounted displays (HMD) are yet a further type or category of AR device which may be used in connection with embodiments of the invention. The procedures of FIGS. 3 and 4, for example, and variants thereof are performed by or with any number of types of AR devices, including but not limited to handheld devices, HMD devices, portable devices, and other AR-enabled or AR-capable devices. Some suitable devices may include off the shelf products from manufacturers such as Magic Leap, Microsoft, Sony, and Facebook.

"Perspective" as used herein may refer to one or more of location, orientation, pose, position, and field of view. If the image or video is a composite from multiple cameras, information for each of the cameras or a representative camera may be used. Exemplary perspective information includes a location and an orientation. Thus, at minimum, this would describe the camera's view with respect to the location from which the image or video is taken and a direction in which the camera was facing to capture the real world content contained in the image or video.

"Position" and "location" are similar terms and may sometimes (but not necessarily always) be used interchangeably in the art. "Location" is especially prevalent when used in the context of geography or a system of reference used for describing geography (e.g., GPS). "Position" is more common in the context of coordinate systems generally, especially those which are fairly independent of geography (e.g., the Cartesian coordinate system). Both "position" and "location" may be expressed as a point. Unlike "position" however, "location" may be expressed as a region, space, or area. For example, a street corner may be a location, or an entire town may be a location.

"Location" and "position" may be used to refer to a place where something is, e.g., in a Cartesian coordinate system (or some other coordinate system). As compared with orientation, location may be characterized as linear position whilst orientation may be characterized as rotational position. Location information may be absolute (e.g., latitude, longitude, elevation, and a geodetic datum together may provide an absolute geo-coded position requiring no additional information in order to identify the location), relative (e.g., "2 blocks north of latitude 30.39, longitude –97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location or position involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location or position information may use any suitable geodetic datum, WGS84 or alternatives thereto.

"Orientation" may be a rotational position (whereas location may be a linear position). Orientation may also be referred to interchangeably as attitude. Even when constrained to a single location, an object may physically take any of a variety of orientations unless further constraints are in place. Orientation may be expressed according to a direction (e.g., a unit vector). Location and orientation together may describe an object according to the six degrees of freedom in three-dimensional space.

"Pose" is a term which may be used to refer to position and orientation in the collective.

Field of view (FOV) is the extent of the observable world seen at a given moment, e.g., by a person or by a camera. In photography, the term angle of view (AOV) is more common but can be used interchangeably with the term field of view (FOV).

Angle of view is one significant camera configuration. A camera is only able to capture an image or video (e.g., a series of images) containing an object if that object is within the angle of view of the camera. Because camera lenses are typically round, the angle of view of a lens can typically be expressed as a single angle measure which will be same regardless of whether the angle is measured horizontally, vertically, or diagonally. Angle of view of a camera, however, is also limited by the sensor which crops the image transmitted by the lens. The angle of view of a camera may be given horizontally, vertically, and/or diagonally. If only a single value is given with respect to a camera's FOV, it may refer to a horizontal angle of view.

Figure 5:
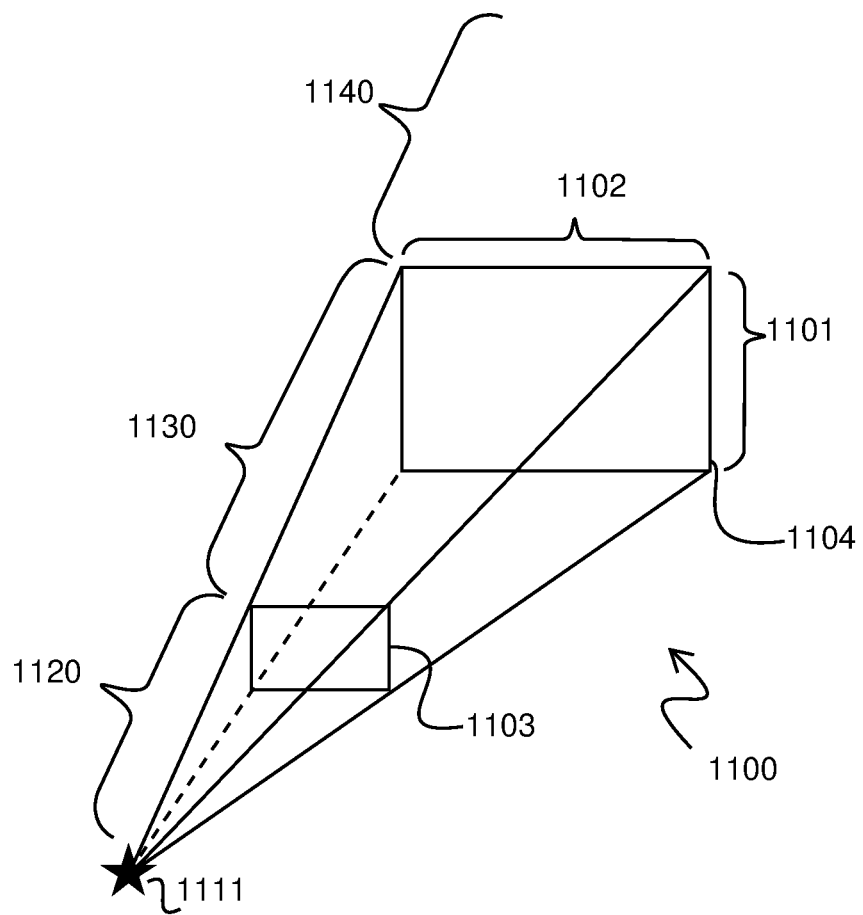
FIG. 5 is a diagram of a frustum.

"Frustum" may be used to refer to a visible region of three-dimensional space. A real world setting may involve a camera, whereas a virtual world setting may involve a viewpoint (e.g., a virtual camera). In the context of digital spaces (e.g., virtual reality worlds), field of view (FOV) is frequently discussed according to a viewing frustum. FIG. 5 shows an example of a viewing frustum 1100, referred to herein simply as "frustum." Because viewports are frequently rectangular, the frustum is often a truncated four-sided (e.g., rectangular) pyramid. For viewports of other shapes (e.g., circular), the frustum may have a different base shape (e.g., a cone). The boundaries or edges of a frustum 1100 may be defined according to a vertical field of view 1101 (an angle, usually expressed in degrees), a horizontal field of view (an angle, usually expressed in degrees), a near limit (a distance or position), and a far limit (a distance or position). The near limit is given by a near clip plane 1103 of the frustum. Similarly, the far limit is given by a far clip plane 1104 of the frustum. Besides these boundaries, a frustum may also include position and orientation. In short, an exemplary frustum may include position, orientation, field of view (horizontal, vertical, and/or diagonal), and near and far limits. In a digital space, virtual objects falling in the region 1120 between the viewpoint 1111 and the near clip plane 1103 may not be displayed. Likewise, virtual objects falling in the region 1140 which are beyond the far clip plane 1104 may not displayed. Only virtual objects within the frustum 1100, that is to say within the region between the near and far clip planes 1103 and 1104 and within the horizontal FOV 1102 and vertical FOV 1101, may be candidates for representation by augmentation. This differs from a real world view of a camera, where visibility of an object is generally based on horizontal FOV 1102 and vertical FOV 1101 only. That is to say, for a camera in a real world setting, real objects which are within the horizontal FOV 1102 and vertical FOV 1101 are generally visible. In a digital space, a near clip plane 1103 may be set to zero (i.e., at the viewpoint) and a far clip plane 1104 may be set to infinity or substantially infinite distance in order to approximate the view from a camera looking upon the real world. However, omission of objects closer than a virtual camera's near clipping plane (which would ordinarily be out of focus for a real camera), and of objects beyond its far clipping plane (which would for a real camera appear so tiny as to be effectively invisible unless their physical dimensions are quite large) is performed as an efficiency gain in a virtual system. A virtual camera's near clipping plane may be placed arbitrarily close, and the far clipping plane arbitrarily far, if an augmented reality system is willing to do the extra processing required to render the resulting increased volume of the frustum. In any case a frustum may generally correspond with a real camera's field of view. It should be understood that obstruction of one object by another as well as object diminution at great camera-to-object (viewpoint-to-object) distances may result in reducing or eliminating visibility of an object even though it technically exists within a frustum 1100.

A user's viewing frustum may correspond with the viewing frustum of a camera or cameras of an AR device which captures real world image data describing the user's real world surroundings. A real world frustum may be determined based on one or more of, for example, a present location (e.g., of the AR device), a field of view (e.g., of the AR device's camera), an orientation (e.g., of the AR device's camera), a position (e.g., of the AR device or camera), a pose (i.e., a combination of position and orientation), and assumptions about the near and far field limits (e.g., predetermined values for near and far field limits).

When a real world frustum is applied to the virtual world of the 3D virtual model, essentially, the real world frustum is used to set the viewing frustum within the virtual world. Virtual objects which are inside the (now virtual) viewing frustum are found as candidates for augmentation. Virtual objects lying entirely outside the viewing frustum are not candidates for augmentation.

A signal may be initiated to direct or control the augmented reality output of an output device. The output device may simply be the original AR device for which the viewing frustum was previously determined. Depending on where the signal originates, it may be transmitted over a network such as one or more wireless networks and/or the Internet. In this way, processing may be performed on one or more remote computers (e.g., servers) of one or more cloud network, with output still being served to an end user on a network connected AR device. Alternatively, a single end-user device may be configured to perform much or all of an exemplary method, in which case the initiated signal may be initiated by a processor of the device and transmitted over a hardware connection to an output element such as a display (e.g., digital screen).

An augmented or virtual reality is ultimately output to the user. Here, the signal previously generated is used by an output device such as a head mounted display (HMD) or a digital display to show the augmentations together with real world content, or else VR with all virtual content.

Perspective information characterizing the real world content of an image or video to be augmented may be collected or simply received. Generally, a GPS sensor, digital compass, and gyroscopic sensors, for example, may be used to collect the 3D position and orientation of a camera co-located with such sensors. A 3D real world frustum is determined based on the 3D position and orientation of the camera, and on assumptions about the near and far field limits. These limits may be set to default values, for example. The real world frustum is applied to the virtual world and thus determines which virtual objects are candidates for augmentation into the original camera images. Virtual objects which are in the viewing frustum may be viable candidates, whereas virtual objects outside the viewing frustum may not. Selection is made of augmentations based on the virtual object candidates. Augmentations are the actual virtual content added to real world content and which may be consumed by a user viewing the AR output. The selection may involve one or more criteria including, for example, user option selections and the relationships between different virtual objects. For instance, one or more processors may determine which of the virtual objects obscure parts of each other based on the frustum in the virtual world. The final augmentations may then be applied to the image or frame containing real world content and output. The process according to some embodiments may involve little or no image processing whatsoever. In some cases image processing may also be used, however.

Generally the means for capturing information is an optical device, more specifically a camera. The type and number of cameras may vary among embodiments, including visible-light sensitive cameras and night vision (infra-red) cameras, among others. Other data besides visual data may be collected to describe real world surroundings. For instance, embodiments may comprise additional sensors such as but not limited to any combination of the some or all of the following: accelerometer(s), location sensor(s) (e.g., GPS modules), gyroscope(s), magnetic field sensor(s) or magnetometer(s), proximity sensor(s), barometer(s), thermometer(s), and microphone(s). The sensors collect the type of data of their respective types (e.g., magnetometer collects magnetic field data or compass data, microphone collects audio data, etc.).

A "camera" as used herein may be digital, analog, or have elements of both camera types. A camera may capture still images or photographs. A camera may capture video (i.e., a video camera). A camera may capture both still images and video. A camera may technically be a combination of cameras the plural outputs of which may be combined to form a single image or video. Generally, a camera includes at least one lens and an image sensor. The lens focuses light, aligns it, and produces a round area of light on an image sensor. Image sensors are typically rectangular in shape, with the result that the round area of light from the lens is cropped to a standard image format. A lens may be a zoom lens or a fixed focal length lens. As of 2017, most mobile multipurpose electronic devices had fixed focal length lens. However, embodiments of the invention may be suited for either type of lens or lenses developed in the future. Photographs or videos captured by a camera may be stored digitally, e.g., with pixel values stored on a computer readable medium. Additional sensors besides the optical elements may be used to collected additional information associated with the captured image(s) or video(s) such as but not limited to location (e.g., GPS coordinates), position, and orientation. Such information may be treated as metadata to a captured image or video.

A camera's context and surroundings are also dependent on such variables as the camera's location, the camera's orientation, the camera's pose (i.e., the position and orientation together), and the camera's field of view. The perspective of a camera may include the position of the camera, the orientation of the camera, and its field of view. One or more of these variables may be used to align a real world view with a virtual world view.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects.

In embodiments of the invention, illustrated and described steps may be configured as a greater or fewer number of steps compared to those which are shown. The exemplary methods shown may also be performed or organized with further substeps.

An exemplary system may comprise at least one camera, one or more AR-enabled output devices, and one or more processors configured to execute computer-readable program instructions which, when executed by the processors, cause the processors to perform steps such as those of methods discussed herein. Cameras may be standalone devices or components within multifunction devices which are image capture enabled (e.g., smartphones, tablets, computers, etc.). Elements may be components to the same device or physically independent of one another.

An "output device", as used herein, may be a device capable of providing at least visual, audio, audiovisual, or tactile output to a user such that the user can perceive the output using his senses (e.g., using her eyes and/or ears). In many embodiments, an output device will comprise at least one display, at least one speaker, or some combination of display(s) and speaker(s). A suitable display (i.e., display device) is a screen of a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally be only the augmentations that are actively shown or output by the device. Visual augmentations are in any case superimposed on the direct view of the real world environment, without necessarily involving the display of any of the original video input to the system. In fact, for systems which do not use the video input to detect image data, the system may include one or more HMDs that have no camera at all, relying entirely on other sensors (e.g. GPS, gyro, compass) to determine the relevant augmentations, and displaying them on otherwise transparent glasses or visors. Output devices and viewing devices may include or be accompanied by input devices (e.g., buttons, touchscreens, menus, keyboards, data ports, etc.) for receiving user inputs.

In some embodiments, one or more processors (e.g., of the device or system that includes the initial camera, or of an AR engine or AR-enabled device) are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressed as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw.

Images/videos captured at some time in the past, previously modified or augmented images/videos, virtual worlds, and/or virtual objects thereof may be stored in individual AR devices and/or in remote databases and/or according to a distributed network of storage resources (e.g., peer-to-peer systems).

"User," as used herein, may be an entity which employs a method, device, or system of the invention. A user may be a human, multiple humans, or some other entity. A user may be, for example, a person intended to consume AR content generated in accordance with a method or variant of a method disclosed herein.

"User" may be an entity that uses a part or a whole of the invention. "End user" herein is generally a subset of "user" and implies the entity actually consumes some output of an embodiment, such as an augmented reality output. Often consumption comprises viewing, but it may also or alternatively involve hearing, feeling, tasting, or smelling (the latter two being uncommon forms of consuming AR at the time of the invention but within the scope of possible AR consumption contemplated by the invention). "User" may refer to a human interacting with or using an embodiment of the invention. A user may be a group or classification of multiple users. A user or users may be characterized according to any of a number of characteristics. For example, a user may be characterized by a classification, a type, an age, an access level, a demographic, a status, a customer status, a profession, or some other quality. A user may be a person, a thing, a computer, a software program, an artificial intelligence, a work group, a company, a corporate division, a maintenance crew, a content creator (e.g., a user that captures real world content, or a user that creates virtual content), a content consumer, a content editor, a programmer, a subscriber, and/or some other entity. The expression "per user basis" may be used in reference to any such user listed here or some other user not listed here but meeting the definition of "user" herein provided.

Some embodiments of the present invention may be a system, a device, a method, and/or a computer program product. A system, device, or computer program product may include a computer readable storage medium (or media) having computer readable program instructions thereon for causing a processor to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

I claim:

1. A computer-implemented method for augmented reality (AR), comprising
    receiving on a continuous or repeating basis sensor data indicative of or usable to determine location and pose of a user or user device;
    displaying AR content on a real screen, wherein the AR content displayed on the real screen comprises both (i) real content and (ii) one or more augmentations selection of which is based on the location and pose of the user device;
    continuously or repeatedly updating for a first duration of time the provided displayed AR content such that updates in the AR content are based on changes in the location and pose;
    receiving a first indicator;
    suspending the step of updating for a second duration of time based on receipt of the indicator, the suspension causing at least some real content of the AR content being output at the time of receipt of the first indicator to be continuously displayed on the real screen irrespective of the pose change; and
    permitting user interaction with at least some virtual content of the AR content while the at least some real content is continuously displayed irrespective of the pose change, wherein the real content comprises one or more images of one or more real surroundings visible from the location of the user or user device and produced from visible light from or reflecting off of the one or more real surroundings which is detected by one or more cameras.

2. The method of claim 1, further comprising
receiving a second indicator;
terminating the suspension and resuming the step of updating based on receipt of the second indicator.

3. The method of claim 2, wherein the first and/or second indicator comprises a user request.

4. The method of claim 3, wherein the user request is one of a user touch input, voice input, or motion input.

5. The method of claim 4, wherein an update or suspension status is conveyed to a user by a display icon.

6. The method of claim 1, wherein the first indicator indicates imminent or immediate pose change.

7. The method of claim 1, wherein during the suspension, some AR content which is real content is displayed irrespective of the pose change while some AR content which is virtual content is updated based on one or more real world events.

8. The method of claim 1, further comprises a step of permitting, during the suspension, panning or zooming.

9. The method of claim 1, wherein the displaying step comprises displaying the AR content on the real screen of either a handheld device or a a head-mounted display (HMD) device.

10. The method of claim 1, wherein the suspension further causes at least some virtual content of the AR content being output at the time of receipt of the first indicator to be continuously displayed irrespective of the pose change, wherein the at least some virtual content includes one or more augmentations representative of one or more real world objects.

11. A device configured for displaying augmented reality (AR) content with at least one display device that is a real screen supported by one or more processors configured to
receive on a continuous or repeating basis sensor data indicative of or usable to determine location and pose of the device;
display AR content on the real screen, the AR content displayed on the real screen comprising both (i) real content and (ii) one or more augmentations selection of which is based on the location and pose of the device;
continuously or repeatedly update for a first duration of time the provided displayed AR content such that updates in the AR content are based on changes in the location and pose;
receive a first indicator;
suspend the step of updating for a second duration of time based on receipt of the indicator, the suspension causing at least some real content of the AR content being output at the time of receipt of the first indicator to be continuously displayed on the real screen irrespective of the pose change; and
permit user interaction with at least some virtual content of the AR content while the at least some real content is continuously displayed irrespective of the pose change,
wherein the real content comprises one or more images of one or more real surroundings visible from the location of the user or user device and produced from visible light from or reflecting off of the one or more real surroundings which is detected by one or more cameras.

12. The device of claim 11, the one or more processors being further configured to
receive a second indicator;
terminate the suspension and resuming the step of updating based on receipt of the second indicator.

13. The device of claim 12, wherein the first and/or second indicator comprises a user request.

14. The device of claim 13, wherein the user request is one of a user touch input, voice input, or motion input.

15. The device of claim 14, wherein an update or suspension status is conveyed to a user by a display icon.

16. The device of claim 11, wherein the first indicator indicates imminent or immediate pose change.

17. The device of claim 11, wherein during the suspension, some AR content which is real content is displayed irrespective of the pose change while some AR content which is virtual content is updated based on one or more real world events.

18. The device of claim 11, the one or more processors being further configured to permit, during the suspension, panning or zooming.

19. The device of claim 11, wherein the device is either a handheld device or a head-mounted display (HMD) device.

20. The device of claim 11, wherein the suspension further causes at least some virtual content of the AR content being output at the time of receipt of the first indicator to be continuously displayed irrespective of the pose change, wherein the at least some virtual content includes one or more augmentations representative of one or more real world objects.

* * * * *